United States Patent [19]
Scharf, III

[11] Patent Number: 5,842,766
[45] Date of Patent: Dec. 1, 1998

[54] FIBER OPTIC JUMP ROPE DEVICE

[76] Inventor: Harry E. Scharf, III, 139 Bradford Rd., Bradford Woods, Pa. 15015

[21] Appl. No.: 743,680

[22] Filed: Nov. 6, 1996

[51] Int. Cl.⁶ ........................................................ F21V 8/00
[52] U.S. Cl. ........................... 362/32; 362/253; 362/278; 362/293; 362/320; 482/82
[58] Field of Search .............................. 362/32, 103, 278, 362/320, 293, 399, 253; 446/485; 482/1, 82

[56] References Cited

U.S. PATENT DOCUMENTS

| | | | |
|---|---|---|---|
| 3,790,775 | 2/1974 | Rosenblatt | 362/32 |
| 4,513,692 | 4/1985 | Kunhsmen et al. | 362/102 |
| 4,529,193 | 7/1985 | Kuhnsman | 482/82 |
| 4,652,981 | 3/1987 | Glynn | 362/103 |
| 4,776,585 | 10/1988 | Maleyko et al. | 482/82 |
| 5,071,118 | 12/1991 | Barnett | 482/82 |
| 5,087,034 | 2/1992 | Solis | 482/82 |
| 5,389,056 | 2/1995 | Ricker | 482/82 |

*Primary Examiner*—Alan Cariaso

[57] ABSTRACT

A fiber optic jump rope device including a pair of handles and at least one bulb situated within an associated handle. Further provided is at least one electrical assembly for providing power to the bulb. A transparent flexible jump rope is included with a hollow tubular configuration. The jump rope is constructed with a pair of open ends. A multiplicity of fiber optic cables are situated within the jump rope. Each fiber optic cable has a first end situated coincident with one of the open ends of the jump rope and a second end with a bend formed therein such that the second end is positioned perpendicular with respect to an interior surface of the jump rope. The optic cables are each adapted to emit light from the second end thereof upon the application of light from the bulb.

14 Claims, 6 Drawing Sheets

FIG. 8
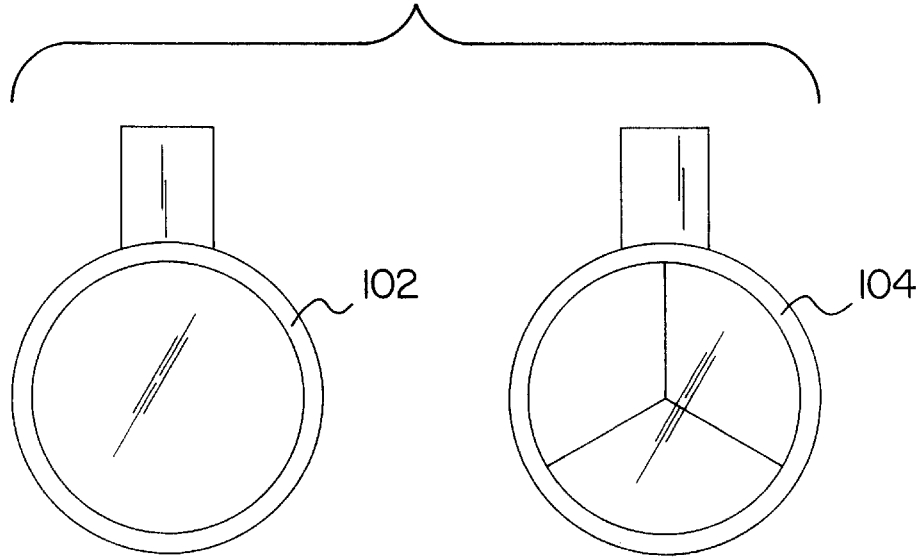
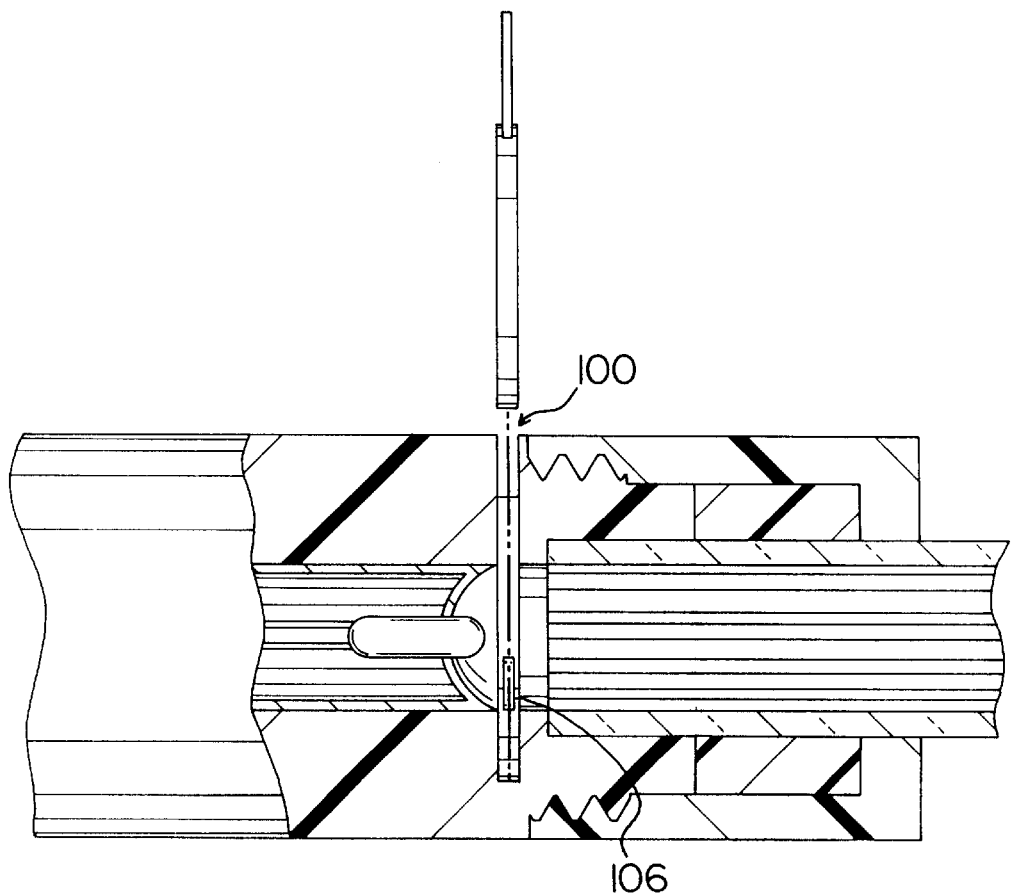
FIG. 7

FIBER OPTIC JUMP ROPE DEVICE

BACKGROUND OF THE INVENTION

1. Field of the Invention

The present invention relates to a new and improved fiber optic jump rope device and, more particularly, pertains to emitting light from a jump rope.

2. Description of the Prior Art

The use of illuminated jump ropes is known in the prior art. More specifically, illuminated jump ropes heretofore devised and utilized for the purpose of emitting light from a jump rope are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,087,034 to Solis discloses an illuminated jump rope which includes a flexible tube for allowing the insertion of light sticks therein. No where in such patent is there taught a jump rope illuminated by fiber optic cables.

U.S. Pat. No. 4,529,193 to Kuhnsman discloses an illuminatable jump rope device which teaches the emission of light from solely the elongated periphery of continuous strands of fiber optic cables. Further such patent discloses a method of actuation including a switch which is situated on the periphery of the handles thereof. The positioning of such switch is prone to inadvertent actuation and deactivation.

In this respect, the fiber optic jump rope device according to the present invention substantially departs from the conventional concepts and designs of the prior art, and in doing so provides an apparatus primarily developed for the purpose of emitting a plurality of high intensity light specs from the ends of a multiplicity of fiber optic cables.

Therefore, it can be appreciated that there exists a continuing need for a new and improved fiber optic jump rope device which can be used for emitting a plurality of high intensity light specs from the ends of a multiplicity of fiber optic cables. In addition, it is apparent that there is a need for an improved method of actuation for an illuminated jump rope which is not subject to inadvertent actuation. In this regard, the present invention substantially fulfills this need.

SUMMARY OF THE INVENTION

In view of the foregoing disadvantages inherent in the known types of illuminated jump ropes now present in the prior art, the present invention provides a new and improved fiber optic jump rope device. As such, the general purpose of the present invention, which will be described subsequently in greater detail, is to provide a new and improved fiber optic jump rope device and methods which have all the advantages of the prior art and none of the disadvantages.

To attain this, the present invention essentially comprises a pair of handles each with a hollow cylindrical configuration. As best shown in FIG. 3, each handle has a first open end, a second open end, and a periphery which is smooth along a majority of its extent. The periphery of the handles each have a plurality of threaded grooves concentrically formed therein adjacent to the first open end and the second open end thereof. Each handle has an interior formed of a cylindrical bore including a first extent with a first diameter in communication with the first open end. The interior further has a second extent in communication with the second open end, wherein the second extent has a second diameter which is less than the first diameter. Further provided are a pair of first caps each having a closed circular face and a periphery integrally coupled to an outer edge of the circular face and extending outwardly therefrom. The periphery of each first cap has a plurality of threaded grooves formed in an interior surface thereof for allowing the threaded engagement thereof with the threaded grooves formed in the periphery of a corresponding handle adjacent the first open end thereof. With reference still to FIG. 3, a pair of bulbs are each fixedly coupled within the second extent of the interior of a corresponding handle. As such, each bulb is adapted to emit light from the open second end of the corresponding handle upon the receipt of power. For providing such power to the bulb, a pair of electrical assemblies are included. As shown in FIG. 3, each electrical assembly includes a first contact formed of a metallic plate fixedly coupled to the circular plate of a corresponding first cap. Associated therewith is a coiled spring coupled to the first metallic plate. Ideally, the coiled spring extends outwardly half the distance in which the periphery of the corresponding first cap extends. A first electric line is provided with a first free end situated adjacent the first open end of a corresponding handle and a second end electrically connected to a corresponding bulb. Also included as a component of each electrical assembly is a second metallic plate with a diameter greater than the second diameter. The second metallic plate is situated within the first extent of the interior of the corresponding handle. Lastly, a second electrical line is electrically connected between the corresponding second metallic plate and bulb. By this structure, a pair of batteries may be situated within the interior of each of the handles. Upon the coupling of the first cap to the first open end of the corresponding handle, the first metallic plate thereof abuts the first end of the first electric line thus providing power to the associated bulb. For providing a method of selectively precluding power from being supplied to the bulbs, the threaded grooves adjacent the first open end of the handle have an annular space situated therein. As such, a first inner threaded groove section and a second outer threaded groove section are defined. By this structure, the metallic plate abuts the first electrical line upon both the inner and outer threaded groove sections being threadedly engaged with the threaded grooves of the first cap. Upon only the outer threaded groove section of the handle being threadedly engaged with the threaded grooves of the first cap, the metallic plate is both precluded from engaging the first electrical line and further the first cap is secured to the handle. As best shown in FIG. 5, a transparent flexible jump rope is included with a hollow tubular configuration. The jump rope is constructed from a material in the group which includes plastic. It should also be noted that the jump rope has a pair of open ends. Situated within the jump rope is a multiplicity of fiber optic cables. Each fiber optic cable has a first end situated coincident with one of the open ends of the jump rope and a second end with a bend formed therein. It is imperative that the bend formed in the second end is such that the second end is positioned perpendicular with respect to an interior surface of the jump rope. Preferably, the fiber optic cables further have a length between 1 inch and half the length of the jump rope. In operation, the optic cables are each adapted to emit light from the second end thereof upon the application of light at the first end thereof. With reference again to FIG. 3, a pair of second caps are included each having a circular face with an aperture formed therein. A periphery is integrally coupled to an outer edge of the circular face and extends outwardly therefrom. The periphery of each second cap has a plurality of threaded grooves formed in an interior surface thereof. Such threaded grooves are adapted for allowing threaded engagement thereof with the threaded grooves formed in the periphery of a corresponding handle adjacent the second open end thereof. For maintaining the open ends of the jump rope adjacent an associated bulb, a pair of annular bushings are included each with a diameter greater than that of the aperture of the second caps. Each annular bushing is coupled about a corresponding open end of the jump rope and is further situated between the second cap and the second open end of a corresponding handle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fiber optic jump rope device which has all the advantages of the prior art illuminated jump ropes and none of the disadvantages.

It is another object of the present invention to provide a new and improved fiber optic jump rope device which may be easily and efficiently manufactured and marketed.

It is a further object of the present invention to provide a new and improved fiber optic jump rope device which is of a durable and reliable construction.

An even further object of the present invention is to provide a new and improved fiber optic jump rope device which is susceptible of a low cost of manufacture with regard to both materials and labor, and which accordingly is then susceptible of low prices of sale to the consuming public, thereby making such a fiber optic jump rope device economically available to the buying public.

Even still another object of the present invention is to emit high intensity speckles of light from a jump rope.

Another object of the present invention is to prevent inadvertent actuation thereof by employing a specially designed method of actuation.

Lastly, it is an object of the present invention to provide a fiber optic jump rope device including a pair of handles and at least one bulb situated within an associated handle. Further provided is at least one electrical assembly for providing power to the bulb. A transparent flexible jump rope is included with a hollow tubular configuration. The jump rope is constructed with a pair of open ends. A multiplicity of fiber optic cables are situated within the jump rope. Each fiber optic cable has a first end situated coincident with one of the open ends of the jump rope and a second end with a bend formed therein such that the second end is positioned perpendicular with respect to an interior surface of the jump rope. The optic cables are each adapted to emit light from the second end thereof upon the application of light from the bulb.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a cross-sectional view of an alternate embodiment of the present invention.

FIG. 8 is front elevational view of the colored disks of an alternate embodiment of the present invention.

The same reference numerals refer to the same parts throughout the various Figures.

DESCRIPTION OF THE PREFERRED EMBODIMENT

Figure 1:
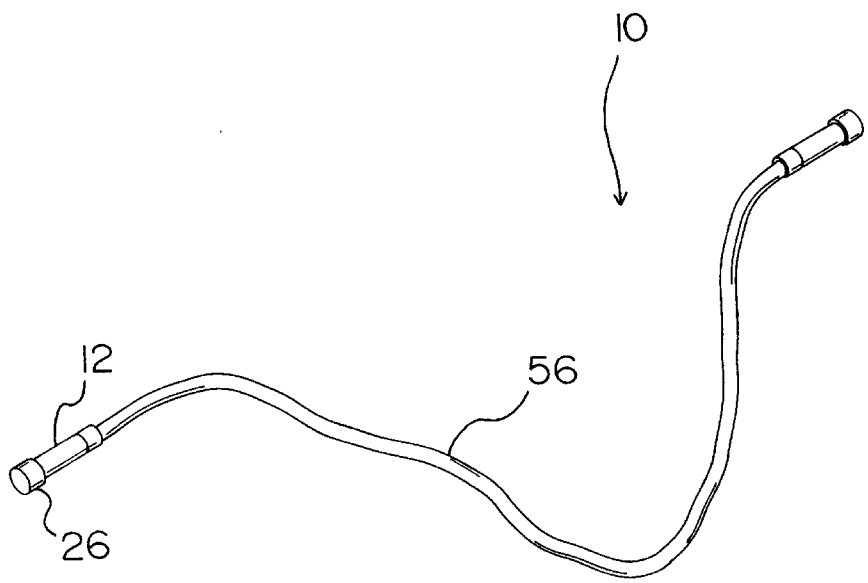
FIG. 1 is a perspective illustration of the preferred embodiment of the fiber optic jump rope device constructed in accordance with the principles of the present invention.
Figure 2:
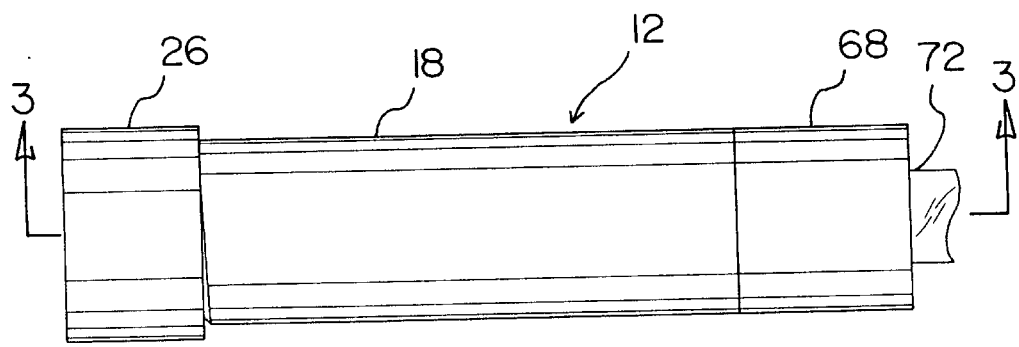
FIG. 2 is a side elevational view of the handle of the present invention.

With reference now to the drawings, and in particular to FIGS. 1 through 6 thereof, the preferred embodiment of the new and improved fiber optic jump rope device embodying the principles and concepts of the present invention and generally designated by the reference numeral 10 will be described.

The present invention, the new and improved fiber optic jump rope device is a system 10 comprised of a plurality of components. Such components, in their broadest context, include a pair of handles, a pair of bulbs, a pair of electrical assemblies, a flexible hollow tube and a multiplicity of optic fibers. Each of the individual components is specifically configured and correlated one with respect to the other so as to attain the desired objectives.

Figure 3:
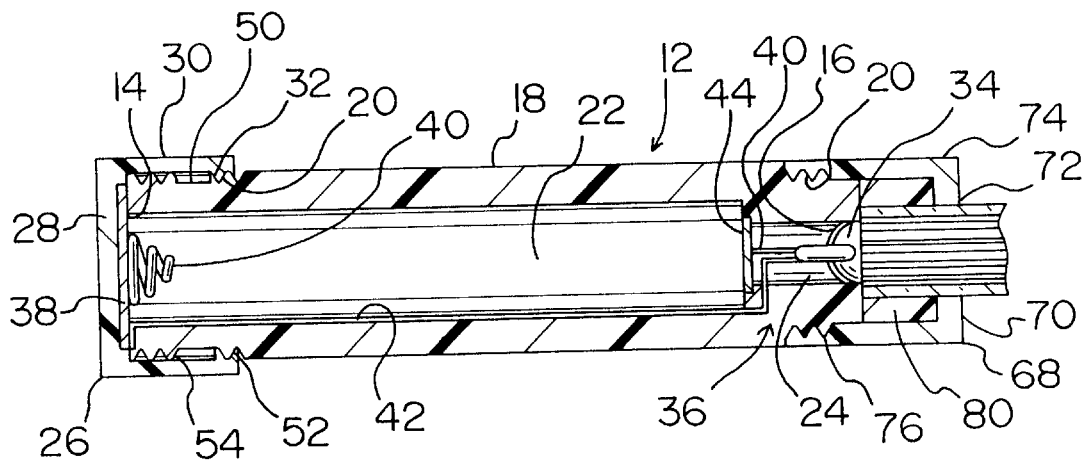
FIG. 3 is a cross-sectional view of the present invention taken along line 3—3 shown in FIG. 2.
Figure 4:
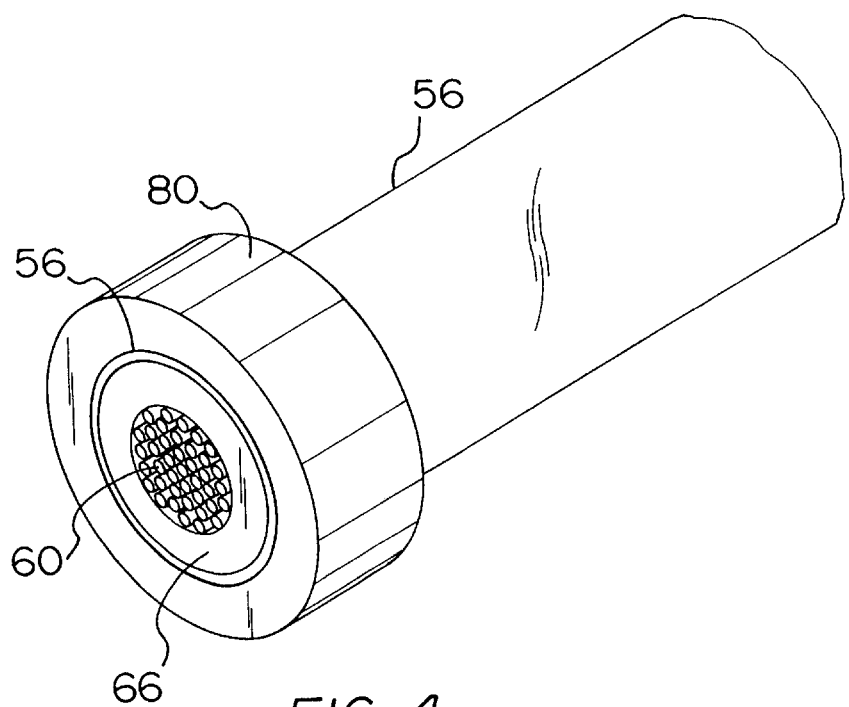
FIG. 4 is a perspective view of the jump rope and associated fiber optic cables of the present invention.

The system 10 of the present invention includes a pair of handles 12 each with a hollow cylindrical configuration. As best shown in FIG. 3, each handle has a first open end 14, a second open end 16, and a periphery 18 which is smooth along a majority of its extent. The periphery of the handles each have a plurality of threaded grooves 20 concentrically formed therein adjacent to the first open end and the second open end thereof. Each handle has an interior formed of a cylindrical bore including a first extent 22 with a first diameter in communication with the first open end. The interior further has a second extent 24 in communication with the second open end, wherein the second extent has a second diameter which is less than the first diameter.

Further provided are a pair of first caps 26 each having a closed circular face 28 and a periphery 30 integrally coupled to an outer edge of the circular face and extending outwardly therefrom. The periphery of each first cap has a plurality of threaded grooves 32 formed in an interior surface thereof for allowing the threaded engagement thereof with the threaded grooves formed in the periphery of a corresponding handle adjacent the first open end thereof.

With reference still to FIG. 3, a pair of bulbs 34 are each fixedly coupled within the second extent of the interior of a corresponding handle. As such, each bulb is adapted to emit light from the open second end of the corresponding handle upon the receipt of power. The bulb has a reflector associated therewith for directing the light solely toward the open second end of the handle.

For providing power to the bulb, a pair of electrical assemblies 36 are included. As shown in FIG. 3, each electrical assembly includes a first contact 38 formed of a first round metallic plate fixedly coupled to the circular plate of a corresponding first cap. Associated therewith is a coiled spring 40 coupled to the first metallic plate. Ideally, the coiled spring extends outwardly half the distance in which the periphery of the corresponding first cap extends. A first electric line 42 is provided with a first free end situated adjacent the first open end of a corresponding handle and a second end electrically connected to a corresponding bulb. Also included as a component of each electrical assembly is a second contact 44 comprising a second metallic plate with a diameter greater than the second diameter. The second metallic plate is situated within the first extent of the interior of the corresponding handle. Lastly, a second electrical line 46 is electrically connected between the corresponding second metallic plate and bulb. By this structure, a pair of unillustrated batteries may be situated within the interior of each of the handles between the metallic plates thereof. Upon the coupling of the first cap to the first open end of the corresponding handle, the first metallic plate thereof abuts the first end of the first electric line thus providing power to the associated bulb. Preferably, the batteries consists of a pair of AA batteries connected in series.

For providing a method of selectively precluding power from being supplied to the bulbs, the threaded grooves adjacent the first open end of the handle have an annular space 50 situated therein. As such, a first inner threaded groove section 52 and a second outer threaded groove section 54 are defined. By this structure, the metallic plate abuts the first electrical line upon both the inner and outer threaded groove sections being threadedly engaged with the threaded grooves of the first cap. Upon only the outer threaded groove section of the handle being threadedly engaged with the threaded grooves of the first cap, the metallic plate is both precluded from engaging the first electrical line and further the first cap is secured to the handle.

Figure 5:
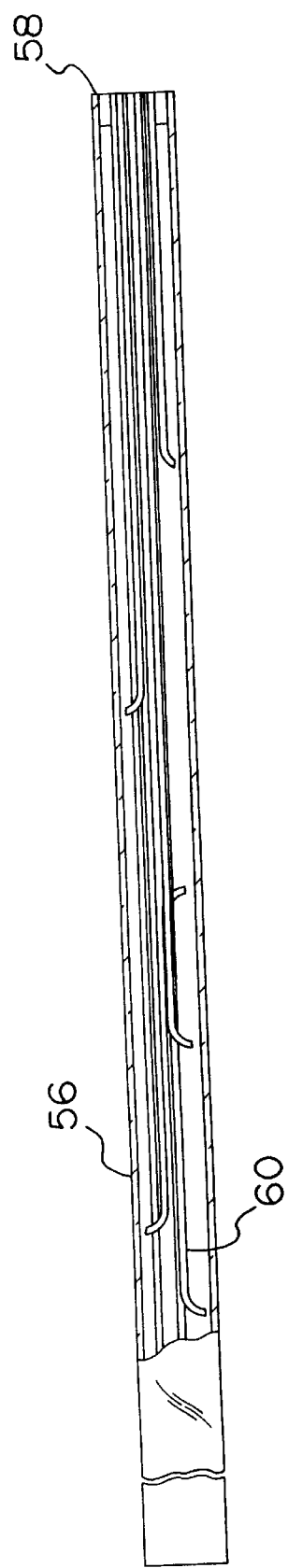
FIG. 5 is a cross-sectional view of the present invention taken along the length of the jump rope.
Figure 6:
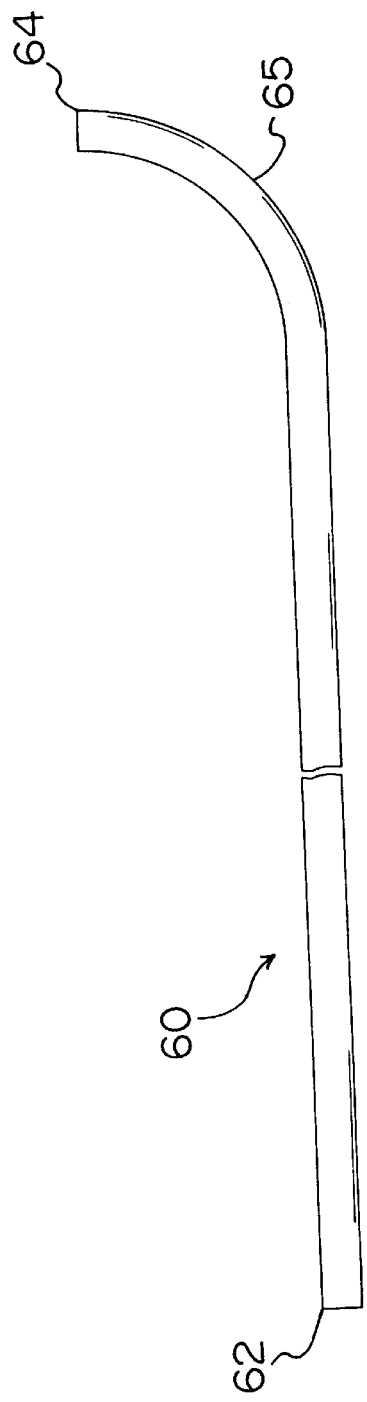
FIG. 6 is a side elevational view of the bend of one of the fiber optic cables.

As best shown in FIG. 5, a transparent flexible jump rope 56 is included with a hollow tubular configuration. The jump rope is constructed from a material in the group which includes plastic. Ideally, a flexible PVC tubing is utilized with a length of approximately 8 feet. It should also be noted that the jump rope has a pair of open ends 58.

Figure 9:
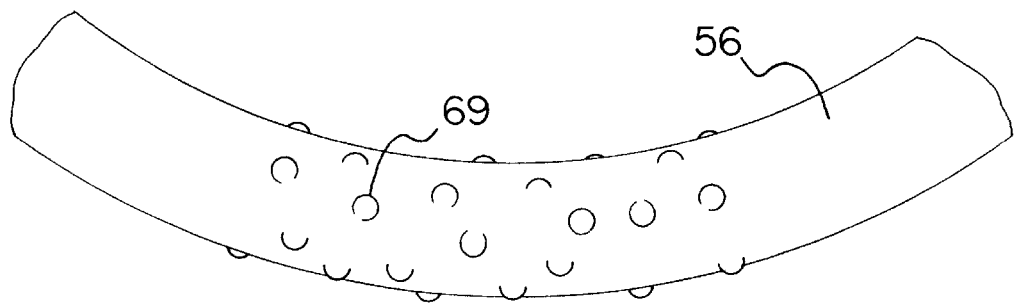
FIG. 9 is a perspective view of the beads of the present invention.
Figure 10:
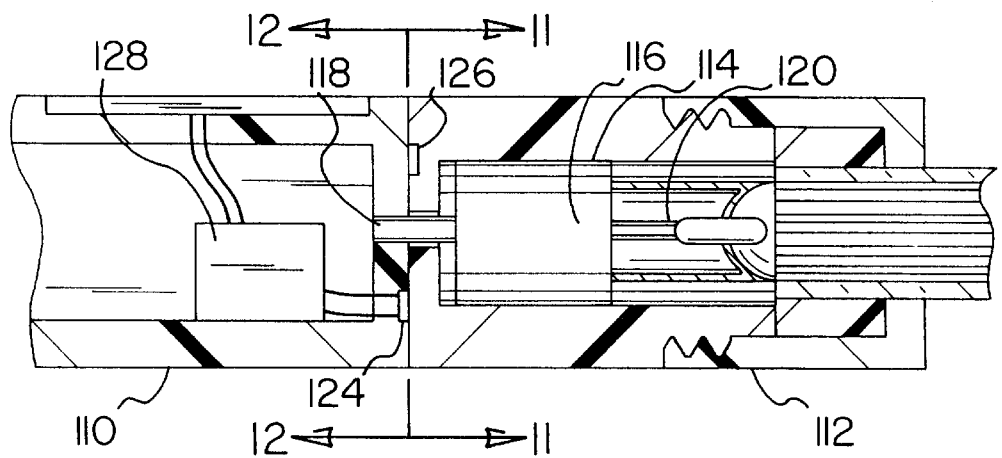
FIG. 10 is a cross-sectional view of an alternate embodiment of the present invention.
Figure 11:
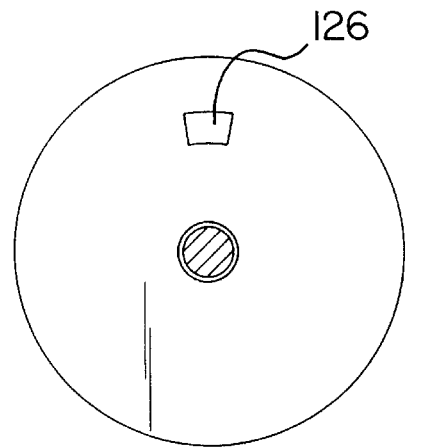
FIG. 11 is a cross-sectional view taken along line 11—11 shown in FIG. 10.

Situated within the jump rope is a multiplicity of cut and polished fiber optic cables 60. Each fiber optic cable has a first end 62 situated coincident with one of the open ends of the jump rope and a second end 64 with a bend 65 formed therein. The first ends are maintained in the proper positioned with a rigid gasket 66 which surrounds the fiber optic cables and is further fixedly coupled to an inner surface of the jump rope. It is imperative that the bend formed in the second end is such that the second end is positioned perpendicular with respect to an interior surface of the jump rope. The bend ideally has a length of b 1and ½ inches. Preferably, the fiber optic cables further have a length between 1 inch and one half the length of the jump rope. In operation, the optic cables are each adapted to emit light from the periphery thereof and the second end thereof upon the application of light at the first end thereof. As shown in FIG. 9, the central extent of the jump rope preferably has a plurality of beads 69 integrally formed thereon so as to preclude the scraping of the jump rope during use. Such is imperative to prevent scraping which would destroy the transparent qualities of the jump rope.

With reference again to FIG. 3, a pair of second caps 68 are included each having a circular face 70 with an aperture 72 formed therein. A periphery 74 is integrally coupled to an outer edge of the circular face and extends outwardly therefrom. The periphery of each second cap has a plurality of threaded grooves 76 formed in an interior surface thereof. Such threaded grooves are adapted for allowing threaded engagement thereof with the threaded grooves formed in the periphery of a corresponding handle adjacent the second open end thereof.

For maintaining the open ends of the jump rope adjacent an associated bulb, a pair of annular bushings 80 are included each with a diameter greater than that of the aperture of the second caps. Each annular bushing is coupled about a corresponding open end of the jump rope and is further situated between the second cap and the second open end of a corresponding handle. As such the jump rope is rotatable secured to the handles.

In an alternate embodiment as shown in FIGS. 7 & 8, the handle is constructed with a slot 100 formed therein between the bulb and the first end of the fiber optic cables. A plurality of colored translucent disks 102 are included each with a tab 104 formed on the periphery thereof and further residing in coplanar relationship with the disk. By this structure, the disk may be selectively inserted and removed from the slot via the tab. To ensure that the disk is maintained within the slot during use, an arcuate bias strip 106 is situated within the slot. As shown in FIG. 8, the disks may either be constructed with a single color or multiple colors. To effect the flashing of the light emitted from a portion of the fiber optic cables, a portion of the disk may be opaque other methods of transmitting light of various colors include coloring the bulbs or coloring the jump rope itself. The bulbs may even be colored different colors to further enhance the aesthetic qualities of the present invention.

In yet another alternate embodiment shown in FIG. 10–13, the handles are separated into an inboard section 110 and an outboard section 112. In the present embodiment, the jump rope and bulb are fixed to the outboard section of a corresponding handle. A generator 114 is also situated within the outboard section with a stator 116 thereof fixed with respect to the outboard section. A rotor 118 of the generator is fixedly coupled to the inboard section such that the inboard section and outboard section are coaxially and rotatably coupled. The generator is operatively coupled to the bulb via a pair of wires 120. In use, the act of jumping rope effects the rotation of the outboard section thereby allowing the generator to produce power for actuating the bulb.

Figure 12:
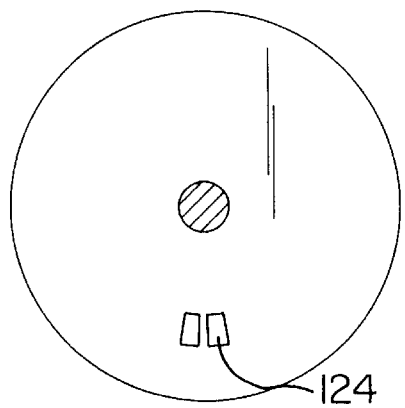
FIG. 12 is a cross-sectional view taken along line 12—12 shown in FIG. 10.
Figure 13:
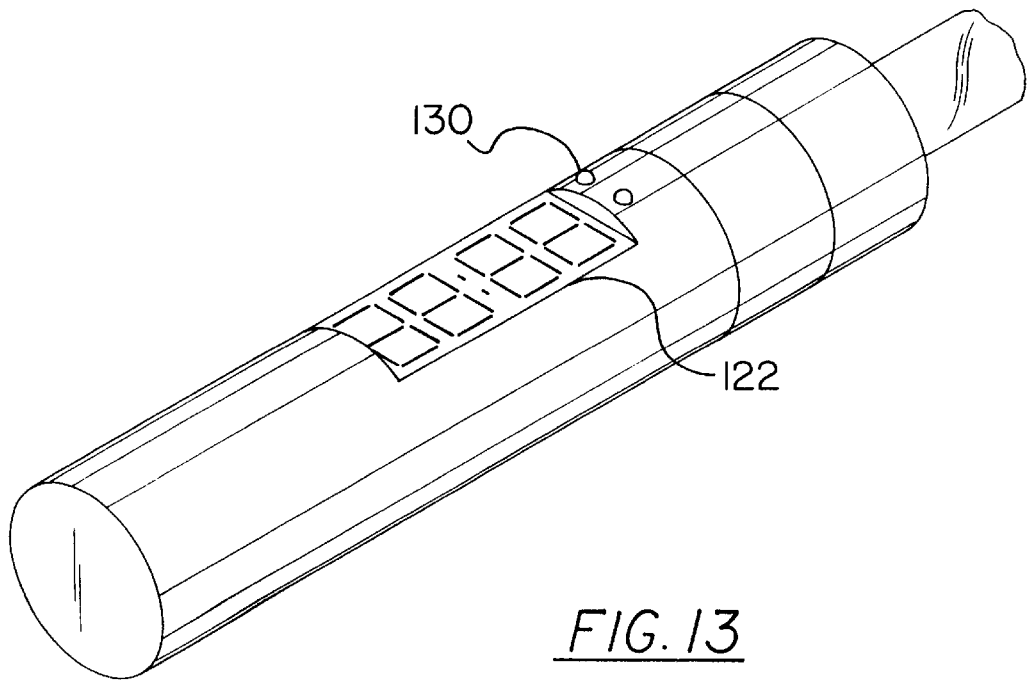
FIG. 13 is a perspective view of an alternate embodiment of the present invention.

Another component of the present embodiments is a liquid crystal display 122 situated on a periphery of the inboard section of at least one of the handles. See FIG. 13. To monitor the rotations of the inboard section with respect to the outboard section, a pair of spaced contacts 124 are situated a predetermined distance from the rotor on the inboard section, as shown in FIG. 12. Another contact 126 is positioned on the outboard section the predetermined distance from the rotor. See FIG. 11. Control circuitry 128 is electrically connected between the display and the spaced contacts of the inboard section. The control circuitry is adapted to monitor the amount of rotations of the outboard section of the handle which, in turn, is representative of the number of times a user has jumped the rope. From such data, the control circuitry is adapted to calculate speed, revolution count, and calories burned. A user may select via a pair of selection buttons 130 which of the foregoing information is displayed on the display. Powering of the control circuitry and display may be afforded by a battery or, in the alternative, supplied from the generator with annular brush contacts situated between the inboard section and outboard section. As an option, the foregoing concept of monitoring the rotation of the jump rope may be utilized in combination with a timing mechanism in the battery powered embodiment of the present invention. The timing mechanism would automatically deactivate the present invention upon a predetermined amount of time passing without rotation of the jump rope.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fiber optic jump rope device comprising, in combination:

a pair of handles each with a hollow cylindrical configuration having a first open end, a second open end, and a periphery which is smooth along a majority of its extent with the exception of a plurality of threaded grooves concentrically formed therein adjacent to the first open end and the second open end, wherein each handle has an interior formed of a cylindrical bore including a first extent with a first diameter in communication with the first open end and a second extent in communication with the second open end with a second diameter which is less than the first diameter;

a pair of first caps each having a closed circular face and a periphery integrally coupled to an outer edge of the circular face and extending outwardly therefrom, the periphery of each first cap having a plurality of threaded grooves formed in an interior surface thereof for allowing the threaded engagement thereof with the threaded grooves formed in the periphery of a corresponding handle adjacent the first open end thereof;

a pair of bulbs each fixedly coupled within the second extent of the interior of a corresponding handle, wherein each bulb is adapted to emit light from the open second end of the corresponding handle upon the receipt of power;

a pair of electrical assemblies each including a first contact formed of a metallic plate fixedly coupled to the circular plate of a corresponding first cap and a coiled spring coupled to the first metallic plate and extending outwardly half the distance in which the periphery of the corresponding first cap extends, a first electric line having a first free end situated adjacent the first open end of a corresponding handle and a second end electrically connected to a corresponding bulb, a second metallic plate with a diameter greater than the second diameter situated within the first extent of the interior of the corresponding handle, and a second electrical line electrically connected between the corresponding second metallic plate and bulb, wherein a pair of batteries may be situated within the interior of each of the handles whereby upon the coupling of the first cap to the first open end of the corresponding handle, the first metallic plate thereof abuts the first end of the first electric line thus providing power to the associated bulb;

a transparent flexible jump rope with a hollow tubular configuration, the jump rope constructed from a material in the group which includes plastic, the jump rope having a pair of open ends;

a multiplicity of fiber optic cables situated within the jump rope, each fiber optic cable having a first end situated coincident with one of the open ends of the jump rope and a second end with a bend formed therein such that the second end is positioned perpendicular with respect to an interior surface of the jump rope, the fiber optic cables having a length between 1 inch and half the length of the jump rope, the optic cables each adapted to emit light from the second end thereof upon the application of light at the first end thereof;

a pair of second caps each having a circular face with an aperture formed therein and a periphery integrally coupled to an outer edge of the circular face and extending outwardly therefrom, the periphery of each second cap having a plurality of threaded grooves formed in an interior surface thereof for allowing threaded engagement thereof with the threaded grooves formed in the periphery of a corresponding handle adjacent the second open end thereof; and a pair of annular bushings each with a diameter greater than that of the aperture of the second caps, each annular bushing coupled about a corresponding open end of the jump rope and situated between the second cap and the second open end of a corresponding handle for maintaining the open ends of the jump rope adjacent an associated bulb.

2. A fiber optic jump rope device comprising:

a pair of handles;

at least one bulb situated within an associated one of said handles;

at least one electrical assembly for providing power to the bulb;

a transparent flexible jump rope with a hollow tubular configuration, the jump rope having a pair of open ends; and a multiplicity of fiber optic cables situated within the jump rope, each fiber optic cable having a first end situated coincident with one of the open ends of the jump rope and a second end with a bend formed therein such that the second end is positioned perpendicular with respect to an interior surface of the jump rope, the optic cables each adapted to emit light from the second end thereof upon the application of light from the bulb.

3. A fiber optic jump rope device as set forth in claim 2 wherein each handle has a hollow cylindrical configuration having a first open end, a second open end, and a periphery which is smooth along a majority of its extent with the exception of a plurality of threaded grooves concentrically formed therein adjacent to the first open end and the second open end, wherein each handle has an interior formed of a cylindrical bore including a first extent with a first diameter in communication with the first open end and a second extent in communication with the second open end with a second diameter which is less than the first diameter.

4. A fiber optic jump rope device as set forth in claim 3 and further including a pair of first caps each having a closed circular face and a periphery integrally coupled to an outer edge of the circular face and extending outwardly therefrom, the periphery of each first cap having a plurality of threaded grooves formed in an interior surface thereof for allowing the threaded engagement thereof with the threaded grooves formed in the periphery of a corresponding handle adjacent the first open end thereof.

5. A fiber optic jump rope device as set forth in claim 4 wherein a pair of bulbs are each fixedly coupled within the second extent of the interior of a corresponding handle, wherein each bulb is adapted to emit light from the open second end of the corresponding handle upon the receipt of power.

6. A fiber optic jump rope device as set forth in claim 5 wherein the electrical assembly includes a pair of electrical assemblies each including a first contact formed of a metallic plate fixedly coupled to the circular plate of a corresponding first cap and a coiled spring coupled to the first metallic plate and extending outwardly half the distance in which the periphery of the corresponding first cap extends, a first electric line having a first free end situated adjacent the first open end of a corresponding handle and a second end electrically connected to a corresponding bulb, a second metallic plate with a diameter greater than the second diameter situated within the first extent of the interior of the corresponding handle, and a second electrical line electrically connected between the corresponding second metallic plate and bulb, wherein a pair of batteries may be situated within the interior of each of the handles whereby upon the coupling of the first cap to the first open end of the corresponding handle, the first metallic plate thereof abuts the first end of the first electric line thus providing power to the associated bulb.

7. A fiber optic jump rope device as set forth in claim 5 and further including a pair of second caps each having a circular face with an aperture formed therein and a periphery integrally coupled to an outer edge of the circular face and extending outwardly therefrom, the periphery of each second cap having a plurality of threaded grooves formed in an interior surface thereof for allowing threaded engagement thereof with the threaded grooves formed in the periphery of a corresponding handle adjacent the second open end thereof.

8. A fiber optic jump rope device as set forth in claim 7 and further including a pair of annular bushings each with a diameter greater than that of the aperture of the second caps, each annular bushing coupled about a corresponding open end of the jump rope and situated between the second cap and the second open end of a corresponding handle for maintaining the open ends of the jump rope adjacent an associated bulb.

9. A fiber optic jump rope device as set forth in claim 2 wherein the fiber optic cables have a length between 1 inch and half the length of the jump rope.

10. A fiber optic jump rope device as set forth in claim 2 wherein the handles each have a slot formed therein between the bulb and the fiber optic cables, the fiber optic jump rope further including a plurality of colored translucent disks adapted to be selectively inserted and removed from the slot for effecting the emission of light of various colors from the fiber optic cables.

11. A fiber optic jump rope device as set forth in claim 2 wherein the electrical assembly is a generator and the handles each form an inboard section and an outboard section with the jump rope and bulb fixed to the outboard section of a corresponding handle, the generator situated within the outboard section with a stator thereof fixed with respect to the outboard section, the generator further having a rotor fixedly coupled to the inboard section such that the inboard section and outboard section are coaxially and rotatably coupled, whereby the generator is operatively coupled to the bulb via a pair of wires such that the act of jumping rope effects the rotation of the outboard section thus allowing the generator to produce power for actuating the bulb.

12. A fiber optic jump rope device as set forth in claim 2 wherein the handles each form an inboard section and an outboard section rotatably coupled, the fiber optic jump rope further including a liquid crystal display situated on a periphery of the inboard section of at least one of the handles, a pair of spaced contacts situated on the inboard section, another contact positioned on the outboard section for monitoring the rotations of the inboard section with respect to the outboard section, and control circuitry electrically connected between the display and the spaced contacts of the inboard section for monitoring the amount of rotations of the outboard section of the handle which is representative of the number of times a user has jumped the rope.

13. A fiber optic jump rope device as set forth in claim 12 wherein the control circuitry is adapted to calculate speed, revolution count, and calories burned and further allow a user to select via a pair of selection buttons which of the foregoing information is displayed on the display.

14. A fiber optic jump rope device comprising:
- a pair of handles;
- at least one bulb situated within an associated one of said handles;
- at least one electrical assembly for providing power to the bulb;
- a transparent flexible jump rope with a hollow tubular configuration, the jump rope having a pair of open ends;
- a multiplicity of fiber optic cables situated within the jump rope, each fiber optic cable having a first end situated coincident with one of the open ends of the jump rope and a second end with a bend formed therein such that the second end is positioned perpendicular with respect to an interior surface of the jump rope, the optic cables each adapted to emit light from the second end thereof upon the application of light from the bulb; and
- a plurality of transparent lenses adapted to be selectively situated between the bulb and fiber optic cables for effecting the emission of light of various colors.

\* \* \* \* \*